March 11, 1930.  P. M. HENKES  1,750,594
ENGRAVING MACHINE
Filed Jan. 25, 1928  2 Sheets-Sheet 2

Patented Mar. 11, 1930

1,750,594

UNITED STATES PATENT OFFICE

PETER M. HENKES, OF RACINE, WISCONSIN, ASSIGNOR TO GEORGE GORTON MACHINE COMPANY, OF RACINE, WISCONSIN, A CORPORATION OF WISCONSIN

ENGRAVING MACHINE

Application filed January 25, 1928. Serial No. 249,410.

This invention relates to improvements in and relating to engraving machines, and I employ this term "engraving machine," in a generic sense to include routing, die sinking, certain forms of so-called milling machines, and other machines wherein my invention can be utilized; and the objects and nature of the invention will be readily understood by those skilled in the art in the light of the following explanations of the following drawings that show what I now believe to be the preferred mechanical expression or embodiment of my invention from among other combinations, constructions and arrangements within the spirit and scope thereof.

An object of the invention is to provide improvements in cutter spindle mountings with the provision of a central depth stop to determine with maximum accuracy the working depth of the rotary cutter.

With this and other objects in view, my invention consists in certain novel features and arrangements or combinations as more fully and particularly explained and specified hereinafter.

Referring to the accompanying drawings forming a part hereof:—

Figure 1:
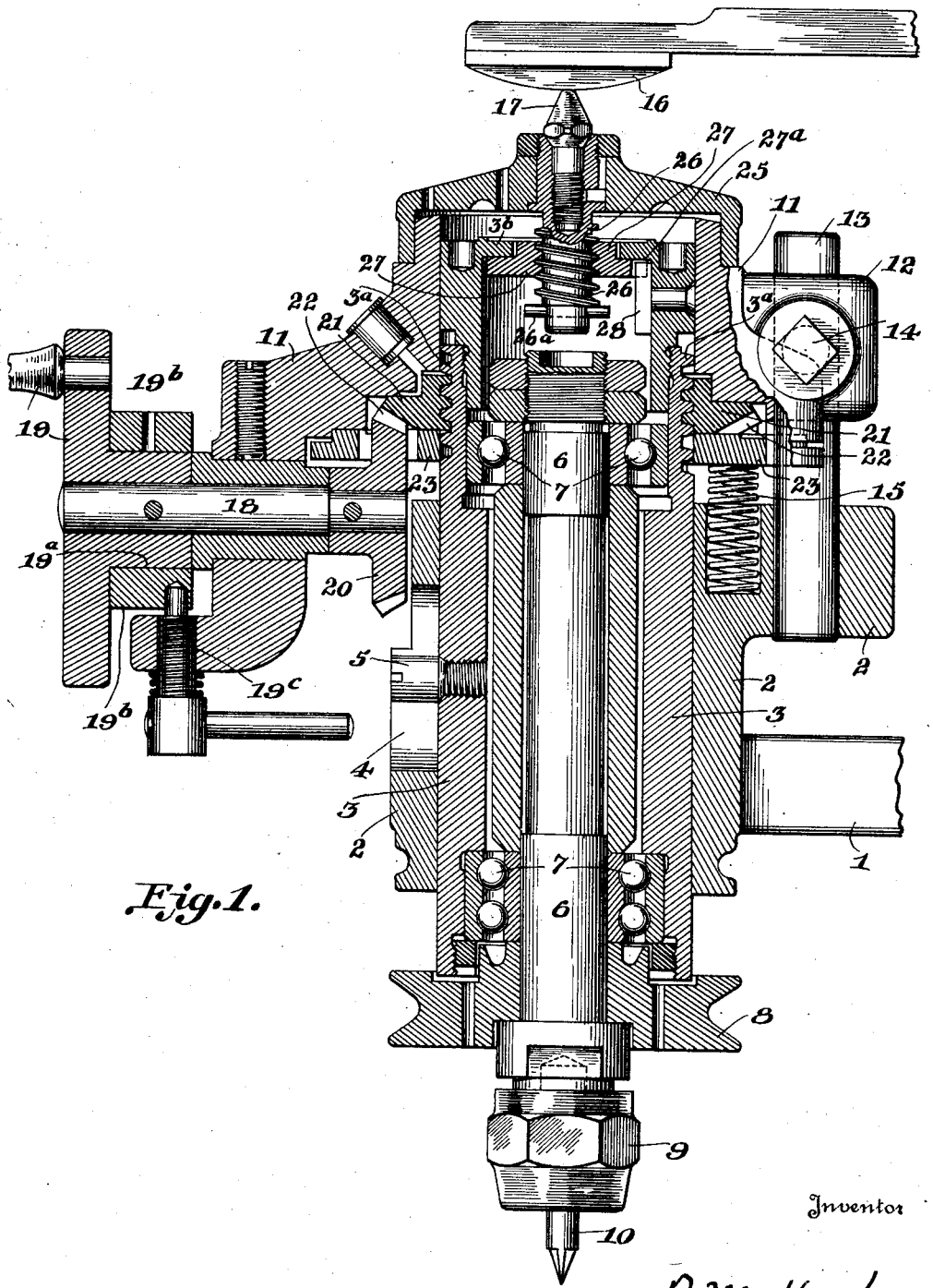
Fig. 1 shows for illustrative purposes, an engraving machine cutter head and operative parts carried thereby in vertical or longitudinal section, the pantograph, cutter spindle driving belt, and other engraving machine parts not being shown, the cutter head pivoted link support being shown in part only, a removable forming guide being diagrammatically indicated.
Figure 2:
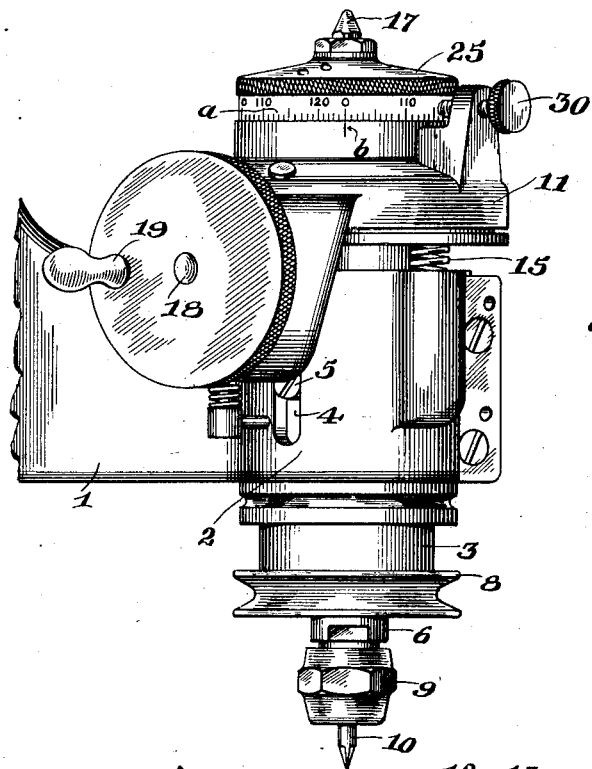
Fig. 2 is a detail side elevation.
Figure 3:
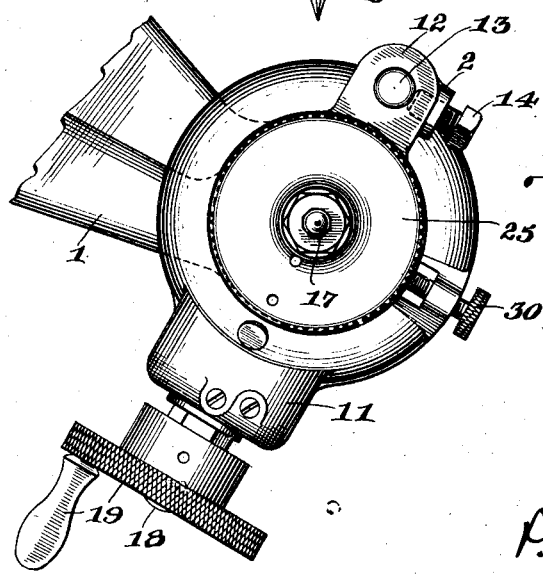
Fig. 3 is a detail top plan.

The drawings, show in part, a so-called engraving, routing or die sinking machine, for illustrative purposes in explaining an embodiment of my present invention and the application thereof.

Machines of this type, as a general rule, provide a holder for the pattern or copy that is to be reproduced by the rotary cutter in scaled relation on the work clamped to a work holder or table. The rotary cutter is carried by a rotary spindle driven by a suitable belt drive. This rotary spindle is carried by and mounted in a feed slide or so-called non-rotary barrel that is slidable toward and from the work through the medium of feed mechanism. This barrel is carried by and mounted in the so-called cutter head of the machine, and this cutter head is carried by a support providing for free universal shifting or movement of the cutter head normally in one plane i. e. usually in a plane parallel with the plane of the work surface to be engraved which is usually a plane parallel with the top surface of the work table. This cutter head support, as a general rule consists of a jointed supporting arm projecting laterally from and pivoted at one end to the machine frame and made up of several laterally swingable pivotally joined links with the cutter head arranged at the free end of the arm. The means employed to trace the pattern or copy is operatively connected with the cutter head or with the free end of said supporting arm to shift the cutter head laterally over the work during an engraving or cutting operation in such manner that the rotating cutter reproduces the copy on or in the work in scaled relation as determined by the adjustment of such means. Such means generally consists of an adjustable pantograph pivotally supported by the machine and pivotally or otherwise coupled to the cutter head and having a tracing stylus to follow the copy and an adjacent handle by which the operator can manipulate the pantograph to cause the stylus to trace the copy and the pantograph to correspondingly in scaled relation shift the cutter head horizontally or laterally over the work, as will be at once understood by those skilled in the art.

In the drawings, I show the free end 1, of the laterally swingable jointed cutter head universal support or arm, and the cutter head body 2, is here shown as formed integral with said end or end link of said arm. This body 2, is here shown in the form of a tubular housing or hub having a vertical bore and forming a vertical slideway and supporting housing for the cutter spindle barrel 3, which extends vertically through the bore of said head from a point above to a point below the same, with a snug sliding fit. The barrel is held in said cutter head body against turning movement or rotation by suitable means. For instance, I show the head formed with vertical elongated slot 4, in which a stud 5, fixed to and projecting radially from the barrel is longitudinally slidable as the barrel is moved longitudinally in the head. The end walls of slot 4 establish the extreme limits of relative longitudinal movement of the barrel in the head.

The barrel 3, is here shown as cylindrical and tubular, and the rotary cutter spindle 6, is carried by this barrel and extends therethrough from a point above the barrel to a point below the barrel. The spindle 6, is longitudinally alined with the barrel, and is suitably mounted therein to freely rotate, and against substantial relative longitudinal movement, as by radial and end thrust bearings 7.

The spindle 6, is provided with any suitable means for rotating or driving the same to actuate the rotary cutter carried thereby. For instance, I show belt pulley 8, below the lower end of the barrel and fixed to the spindle to receive a suitable spindle-driving belt transmission, not shown.

The projecting lower end of the spindle carries chuck 9, by which a rotary cutter 10, is removably clamped to the spindle in longitudinal downward continuation thereof, i. e. alined with the spindle axis of rotation.

Suitable mechanism is provided for feeding the barrel 3, and the cutter assembly carried thereby, toward and from the work, with respect to the cutter head, and for maintaining the same at the desired elevation and the rotary cutter at the desired working depth. For instance, in the particular example illustrated, I show a top yoke 11, above the body 2, of the cutter head and having a vertical cylindrical bore longitudinally alined with the vertical bore of body 2, and longitudinally receiving the portion of the barrel 3, that rises from and projects above body 2, with a longitudinally slidable fit. This yoke, for flat surface engraving purposes, in effect forms a part of and is rigid with the body 2, and is preferably so constructed where the machine is to operate only on flat surfaces. In the particular example illustrated, the machine is capable of adjusting or setting to operate on curved surfaces and also flat surfaces (see patent to Horner No. 1,562,237, Nov. 17, 1925) and hence the yoke 11, is capable of being adjusted to rise and fall with the barrel independently of body 2, for curved surface work, and of being fixed to the body 2, as though an integral part thereof, for flat surface work.

Hence, in this example, the separate yoke 11, is formed with a rigid lateral ear 12, above the body 2, and this ear is formed with a vertical bore that slidably receives the vertical upstanding stud 13, rigid with the body 2. The yoke carries clamping means, such as set screw 14, by which the yoke can be clamped to said stud to thereby become a fixed part of head 2, and whereby the yoke, on release of the clamp, can slide vertically on the stud with respect to the body 2.

One or more coiled expansion springs 15, are interposed between the top face of body 2, and the bottom face of yoke 11, to force the yoke, barrel and cutter spindle assembly upwardly with respect to the body 2, when clamp 14, is released, and the machine is operating on a curved surface. When the parts are thus adjusted for operation on a curved surface of the work, a forming guide 16, fixed to the machine frame and located above the yoke 11, is provided to cooperate with the rounded stop or tracer pin 17, projecting upwardly from and rigid with the yoke in axial alinement with the axis of rotation of the rotary cutter and its spindle, as set forth in the hereinbefore mentioned patent. However, I do not wish to so limit all features of my invention.

In the example shown, the feed mechanism for moving the cutter to and from and holding it at working position to produce cuts of the desired uniform depth in the work, comprises a radially arranged horizontal rotary shaft 18, carried by the yoke, and at its outer end having suitable manually operated actuating means, such as exposed handle 19, and at its inner end having bevel gear 20, fixed thereto and driven thereby. The gear 20, is in constant mesh with and rotates rotary ring nut 21, through the medium of the annular exterior beveled gear 22 of said nut. The nut is rotatably mounted in the yoke concentric with the bore thereof and with the barrel 3, in said bore which barrel extends upwardly through said nut and is longitudinally and externally screw threaded, at 3$^a$, and in mesh with the internal screw thread of the nut. The nut 21, is mounted in an annular recess in the yoke surrounding the bore thereof against relative longitudinal movement yet to permit free rotation. The nut is held up in this recess, by annular plate or ring 23, secured to the bottom of the yoke and forming the nut supporting floor of said recess.

By rotation of the handle 19, the non-rotary barrel can be moved up and down in the cutter head body 2, and yoke 11, to carry the rotary cutter from the work or toward the work to set and hold the cutter in vertical position to cut to the predetermined depth. The screw 3$^a$, and meshing nut 21, lock the barrel to the yoke 11, against relative vertical movement when the nut is at rest, and hence require the barrel to rise and fall with the yoke and through the body 2, when the clamping nut 14, is released from stud 13.

If so desired, the feed operating shaft 18, can be provided with means to lock or clamp the same against rotation, when the cutter has been set at the desired depth, or otherwise. For instance, I show the hub 19ª, of the hand wheel 19, formed with a cylindrical surface concentric with the longitudinal axis of shaft 18, with a non-rotary collar 19ᵇ, concentrically mounted on said surface. The yoke 11, carries a rotatable longitudinally threaded screw or stud 19ᶜ, arranged radially of the collar and shaft with its inner end bearing against the collar. This clamping screw 19ᶜ, is rotatable and longitudinally adjustable in and extends through a tapped hole through a rigid arm of yoke 11, and is provided at its outer end with a handle, whereby the screw can be adjusted to bear with more or less pressure against the collar to lock or release the shaft.

It is often necessary in conducting engraving operations to produce cuts that are accurate in depth to within limits of several thousandths of an inch. It is hence necessary to provide positive or rigid and exceedingly accurate depth stop means for the cutter spindle or its barrel. I have found that depth stops that are offset or spaced radially from the longitudinal axis of the cutter spindle are not sufficiently positive or rigid to assure closely accurate predetermination of the depth of the cuts, inasmuch as such stops often permit the cutters to be forced down by the cutter spindle feed mechanism to a point below that supposedly established by such stops. I have solved this problem and overcome this difficulty, by providing a fixed or positive cutter depth stop mechanism centrally arranged with respect to the cutter spindle and alined with the longitudinal axis thereof. For instance, the particular example illustrated, provides a cap 25, closing the upper otherwise open end of the bore through the yoke 11, in which the cutter spindle barrel is vertically slidable. In this instance, this cap 25, is formed with a depending annular flange surrounding a cylindrical neck forming the annular upper end of the yoke. This cap is rotatably mounted on the yoke to constitute a handwheel that turns or rotates on a vertical axis alined with the longitudinal axis of the cutter spindle 6. The tracing guide 17, is rigid with and projects upwardly from the center of this handwheel forming cap 25.

A central exteriorly screw threaded stud 26, is rigid with and depends from the cap into the upper end of the bore of the yoke 11, and into the upper end of the cutter spindle barrel 3, and in longitudinal alinement with the axis of the cutter spindle 6. A non-rotary vertically movable nut 27, is arranged on and in mesh with the screw 26, and this nut is held against rotation by a vertical key 28, within and fixed to the barrel 3, and slidably fitting in a vertical slot or notch 27ª, in the edge portion of the nut. The nut 27, is arranged within the upper end of the barrel 3, below and in operative relation to an annular stiff horizontal inwardly-projecting stop flange 3ᵇ, rigid with the barrel and overhanging the nut 27. The nut is usually annularly rabbeted at its top to form a flat top seat to receive said flange and provide an annular horizontal flat top contact surface parallel with the corresponding complementary bottom contact surface of the stop flange 3ᵇ. The lower end of the rotary screw 26, is provided with a radially projecting stop pin 26ª, to prevent the nut 27, escaping from the screw. The cap or hand wheel 25, and the screw 26, fixed thereto, are held against vertical or longitudinal movement with respect to the yoke and the barrel 3, but are free to rotate in either direction for elevating and depressing the nut 27, which cooperates with the top flange 3ᵇ, in constituting the depth stop for the rotary cutter.

The flange of the hand wheel or cap 25, is circumferentially provided with an exterior visible scale or graduations a, indicating the depth of cut in thousandths of an inch, and at an adjacent stationary portion of the yoke a fixed index point b, for the scale is provided. A locking or clamp screw 30, is also shown, for clamping the hand wheel 25, against movement when rotated to set the stop nut at the elevation indicated by the scale and its index to produce the depth of cut required.

When the machine is to operate on a flat or plane surface, i. e. in the particular example shown, when the yoke 11, is rigid with and acts as a part of the cutter head body 2, by the clamping action of screw 14, against stud 13; the nut 27, is set by rotation of hand wheel 25, and screw 26, at the elevation determined by scale a, to cause the rotary cutter to produce cuts in the work all of the uniform depth required.

The nut 27, is thus set when the barrel and the rotary cutter assembly carried thereby, are elevated from working position. When the nut 27, has been set at the required elevation, and the engraving operation is to proceed, the hand wheel 19, is rotated to feed the barrel and consequently the rotating cutter 10, to the work, and this feeding movement continues until the stop member 3ᵇ, of the barrel closes down on the stop member 27, (the nut) and firmly abuts the same. The cutting depth of the cutter will then be positively and rigidly established without possibility of further cutter depression by application of force to the feed wheel 19, causing springing or flexing of stop members as often occurs where offset stop members and parts are employed. In this connection, it will be noted that the depth stop assembly is exceedingly simple and compact and located at the barrel end with the axes of rotation of moving parts alined with each other and with the common longitudinal axis of the barrel and cutter spindle, and also that the abutting stop members are stiff against flexing, annular in form, and concentric with the cutter spindle and barrel and located centrally within the circle of the barrel, although I do not now wish to limit all features of my invention to substantially such forms and arrangements.

What I claim is:—

1. In an engraving machine and the like; a cutter head, a non-rotary barrel slidably confined thereto; a rotary cutter spindle carried by said barrel and adapted to carry and drive a cutter; feed mechanism for feeding the barrel to carry the cutter toward and from the work; and a cutter depth stop mechanism embodying manually actuated adjusting means and annular stop members arranged in said barrel concentric with the axis of the cutter spindle and cooperating with the barrel and supported independently of said spindle.

2. An engraving machine and the like, having a cutter head; a barrel longitudinally slidable therein; feed mechanism for the barrel; a rotary driven cutter spindle adapted to hold and carry the rotary cutter with its axis alined with the axis of spindle rotation, said spindle carried by and arranged longitudinally of the barrel; and adjustable cutter depth stop mechanism embodying manual adjusting means supported independently of the barrel and spindle, a stop member rigid with the barrel, and an opposing cooperating adjustable stop member supported by said adjusting means and adjustable thereby longitudinally of the axial line of rotation of the spindle, said stop members being longitudinally alined with said spindle.

3. An engraving machine and the like, having a driven rotary cutter spindle for carrying and driving the rotary cutter; a barrel carrying said spindle whereby the same is fed to carry its cutter toward and from and held in working position; and a cutter depth stop assembly embodying a stop member carried by and moving with said barrel and centrally arranged adjacent to an end of said spindle, another stop member supported independently of said barrel and said spindle and centrally arranged in opposing cooperating relation to said first mentioned stop member, said stop members being longitudinally alined with said spindle and arranged in said barrel, and manually actuated exteriorly accessible adjusting or setting means for adjusting one of said members longitudinally of the spindle axis of rotation and toward and from the other member to determine the cutting depth of the cutter.

4. An engraving machine and the like, having a cutter head, a driven rotary cutter spindle for carrying and driving the rotary cutter; spindle holding means carrying said spindle and whereby the same is fed to carry its cutter toward and from and held at cutter working position; and a cutter depth stop assembly embodying two annular alined opposing cooperating stop members concentric with the cutter spindle axis of rotation, a screw longitudinally alined with said axis of rotation, and manually operated means for supporting and rotating said screw, said last mentioned means being supported independently of said spindle and said spindle holding means, one of said stop members being carried by and longitudinally movable with said spindle holding means, the other stop member being adjusted and held by said screw.

5. An engraving machine and the like, having a cutter head providing a non-rotary barrel; feed means for moving the barrel longitudinally and holding the same in the desired longitudinal position; a driven rotary cutter spindle arranged longitudinally of and mounted in the barrel against relative longitudinal movement; and cutter depth stop mechanism embodying a rotary exterior hand wheel supported independently of the barrel and spindle, an adjustable stop member, and screw threaded means connecting said hand wheel and said stop member for adjusting and holding the same in adjusted position, said barrel provided with a stop member opposing and cooperating with said adjustable stop member, said stop members being arranged in the upper end of said barrel and longitudinally alined with said spindle.

6. In combination, a cutter head body; a non-rotary barrel slidable longitudinally in said body and provided with and carrying the rotary cutter spindle; a yoke normally fixed to said body and when released therefrom adapted to float with said barrel, the upper end of said barrel being longitudinally slidable in said yoke; an exterior rotatable cap on said yoke provided with a fixed rotary central screw depending into the barrel; a non-rotary nut on and carried by said screw and adjusted longitudinally of the barrel by rotation of the cap; the upper end of said barrel providing a portion fixed thereto and overhanging said nut and constituting an opposing cooperating stop; and manually operated feed mechanism for moving said barrel longitudinally and holding the same with the spindle at the position to which fed.

7. An engraving machine and the like cutter head embodying a non-rotary longitudinally slidable cutter spindle barrel having an exterior longitudinally screw threaded portion; a driven rotary cutter spindle carried by and rotatable in said barrel and arranged longitudinally thereof; a rotary ring nut surrounding and in mesh with said threaded portion of the barrel to feed the barrel longitudinally on rotation of the nut; a hand operated rotary shaft arranged radially of the barrel and having beveled gear rotating connection with said nut for driving the same; a yoke in which said shaft and nut are mounted; and a ring secured to said yoke and confining the nut therein.

8. In combination, a cutter head body; a cutter spindle barrel longitudinally slidable through and non-rotary in said body; a driven rotary cutter spindle longitudinally arranged in and carried by said body and adapted to carry the rotary cutter; a top yoke in which said barrel is longitudinally slidable; means normally locking said yoke rigid with said body and whereby the yoke and barrel can be released from the body to move vertically independently thereof; feed mechanism carried by the yoke for sliding the body longitudinally and supporting the same from the yoke; a rotary member alined with the axis of rotation of the spindle and provided with a central exterior upstanding guide pin, and cutter depth stop means between said rotary member and the barrel and longitudinally alined with said spindle and set and adjusted by rotation of said member.

9. In combination; a cutter head; a longitudinally slidable barrel; a cutter spindle arranged longitudinally of and rotatably mounted in said barrel against end thrust and provided with driving means; feed mechanism for moving said barrel longitudinally to carry the rotary cutter to and from and to hold the same in cutting position, said mechanism embodying annular rotary means surrounding and having screw thread operative driving connection with said barrel and concentric therewith; and cutter depth stop mechanism cooperating with said barrel to accurately set and predetermine the depth to which said cutter can work, said stop mechanism embodying cooperating annular stop members having opposing abutment faces concentric with the axis of rotation of said spindle, means being provided for causing relative movement between said members longitudinally of the axial line of the spindle to set the members to predetermine said cutting depth.

10. In combination; a cutter head; a longitudinally slidable barrel; a cutter spindle arranged longitudinally of and rotatably mounted in said barrel against end thrust and provided with driving means; feed mechanism for moving said barrel longitudinally to carry the rotary cutter to and from and to hold the same in cutting position, said mechanism embodying annular rotary means surrounding and having screw thread operative driving connection with said barrel and concentric therewith; and cutter depth stop mechanism cooperating with said barrel to accurately set and predetermine the depth to which said cutter can work, said stop mechanism embodying cooperating annular stop members having opposing abutment faces concentric with the axis of rotation of said spindle, means being provided for causing relative movement between said members longitudinally of the axial line of the spindle to set the members to predetermine said cutting depth, said means having an exposed manually operated actuating member supported independently of the spindle and barrel, both stop member opposing faces being stationary when abutting and thus determining the cutter working depth.

11. In combination, in an engraving machine, a cutter head; a non-rotary longitudinally slidable barrel; a cutter spindle mounted to rotate in said barrel and held against relative longitudinal movement; a rotary ring nut surrounding said barrel and concentric with said spindle and having screw threaded operative connection with the barrel to feed the same toward and from the work by rotation of said nut; means for rotating the nut to slide the barrel on its feed and return strokes; means to hold the rotary nut against longitudinal movement relative to the barrel; and cutter depth stop mechanism arranged at one end of the barrel and provided with manually actuated means for setting the stop mechanism to predetermine the cutting depth, said stop mechanism embodying cooperating opposing stop abutments alined with the longitudinal axis of the spindle.

Signed at Racine, Racine county, Wisconsin, this 19th day of January, 1928.

PETER M. HENKES.